US011308314B2

(12) United States Patent
Hashimoto et al.

(10) Patent No.: US 11,308,314 B2
(45) Date of Patent: Apr. 19, 2022

(54) SYSTEMS, DEVICES, AND METHODS FOR GENERATING A POSE ESTIMATE OF AN OBJECT

(71) Applicant: Toyota Research Institute, Inc., Los Altos, CA (US)

(72) Inventors: Kunimatsu Hashimoto, Brookline, MA (US); Duy-Nguyen Ta Huynh, Lexington, MA (US); Eric A. Cousineau, Cambridge, MA (US); Russell L. Tedrake, Needham, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 28 days.

(21) Appl. No.: 16/822,318

(22) Filed: Mar. 18, 2020

(65) Prior Publication Data

US 2020/0302160 A1 Sep. 24, 2020

Related U.S. Application Data

(60) Provisional application No. 62/821,566, filed on Mar. 21, 2019.

(51) Int. Cl.
*G06K 9/00* (2022.01)
*G06K 9/62* (2022.01)
*G06T 7/73* (2017.01)

(52) U.S. Cl.
CPC ....... *G06K 9/00335* (2013.01); *G06K 9/6262* (2013.01); *G06T 7/75* (2017.01)

(58) Field of Classification Search
CPC .... G06K 9/00335; G06K 9/6262; G06K 9/50; G06K 9/00201; G06T 7/75; G06T 2207/20076; G06T 2207/20081; G06T 2207/20084; G06T 7/73
See application file for complete search history.

(56) References Cited

U.S. PATENT DOCUMENTS

| 10,074,054 B2 | 9/2018 | Adams et al. |
| 2018/0349158 A1 | 12/2018 | Swersky et al. |
| 2019/0213412 A1* | 7/2019 | Kottenstette ......... G06K 9/4623 |
| 2020/0216033 A1* | 7/2020 | Herman ............ G06K 9/00791 |

(Continued)

FOREIGN PATENT DOCUMENTS

| CN | 108499104 | * | 9/2018 |
| EP | 2275993 A2 | | 1/2011 |

OTHER PUBLICATIONS

Pavlakos et al., "6-DoF Object Pose from Semantic Keypoints", 2017 IEEE international conference on robotics and automation (ICRA) (Year: 2017).*

(Continued)

*Primary Examiner* — Qian Yang
(74) *Attorney, Agent, or Firm* — Dinsmore & Shohl LLP

(57) ABSTRACT

In an embodiment, a pose estimation device obtains an image of an object, and generates a pose estimate of the object. The pose estimate includes a respective heatmap for each of a plurality of pose components of a pose of the object, and the respective heatmap for each of the pose components includes a respective uncertainty indication of an uncertainty of the pose component at each of one or more pixels of the image.

11 Claims, 11 Drawing Sheets

(56) References Cited

U.S. PATENT DOCUMENTS

2020/0298116 A1\* 9/2020 Wang .................... A63F 13/537

OTHER PUBLICATIONS

Yu Xiang et al., "PoseCNN: A Convolutional Neural Network for 6D Object Pose Estimation in Cluttered Scenes", May 26, 2018, 10 pages, https://arxiv.org/pdf/1711.00199.pdf.
Eric Brachmann et al., "Uncertainty-Driven 6D Pose Estimation of Objects and Scenes from a Single RGB Image", Computer Vision Foundation, 2016, 9 pages, https://www.cv-foundation.org/openaccess/content_cvpr_2016/papers/Brachmann_Uncertainty-_Driven_6D_Pose_CVPR_2016_paper.pdf.

\* cited by examiner

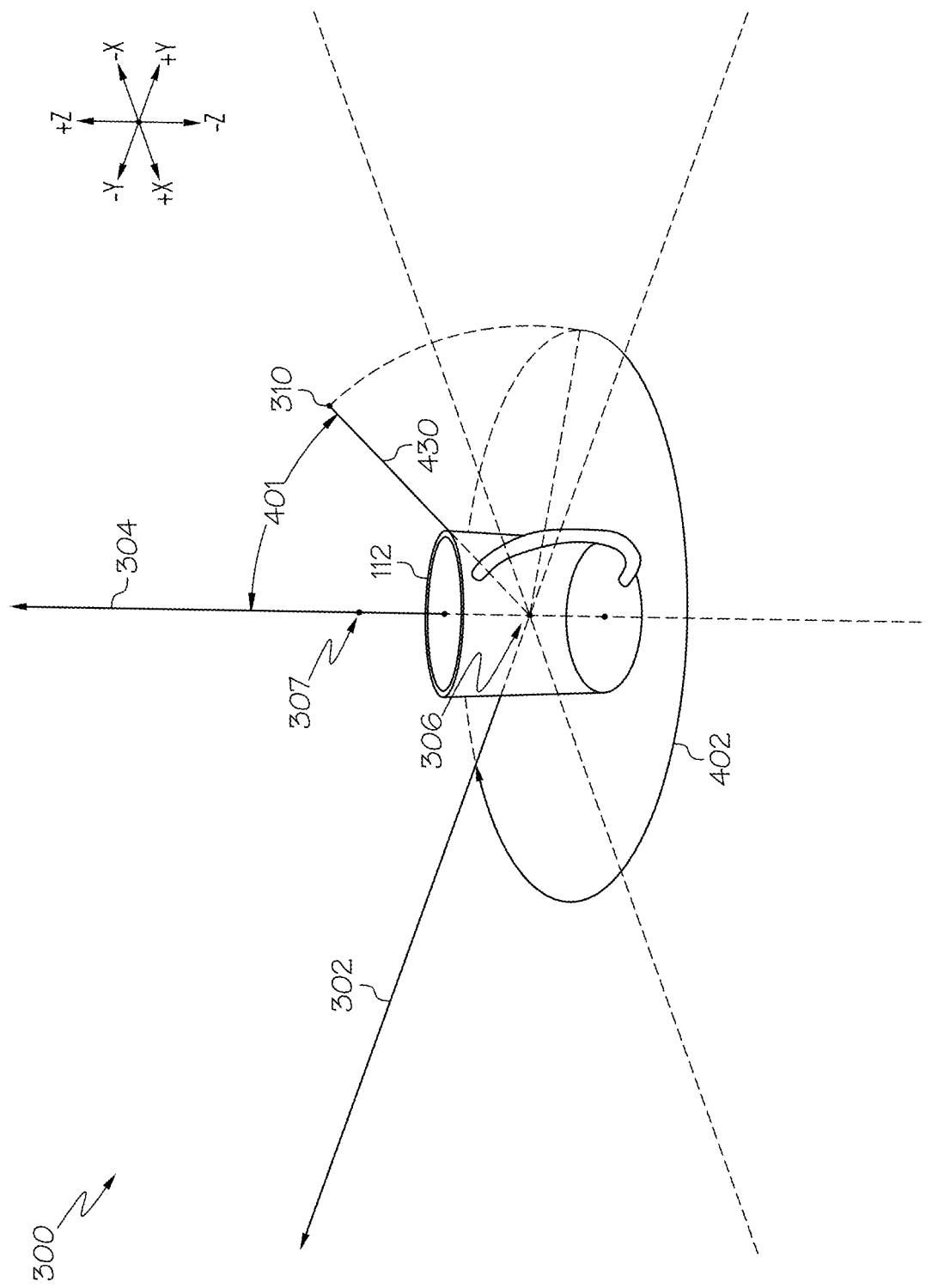

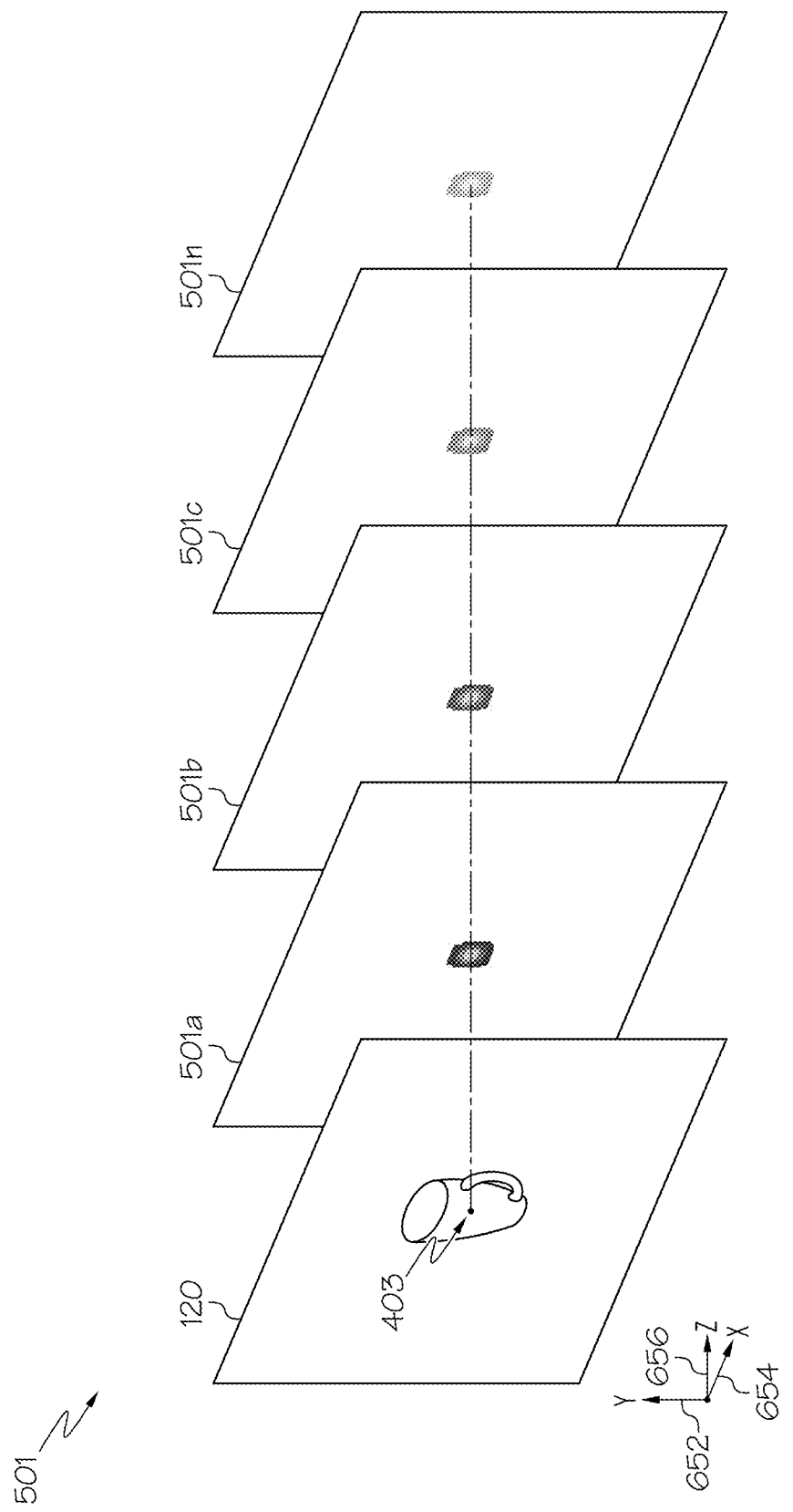

SYSTEMS, DEVICES, AND METHODS FOR GENERATING A POSE ESTIMATE OF AN OBJECT

CROSS-REFERENCE TO RELATED APPLICATIONS

This application claims the benefit of U.S. Provisional Application No. 62/821,566, filed Mar. 21, 2019, the entire contents of which are incorporated by reference in their entirety.

TECHNICAL FIELD

The present disclosure generally relates to pose estimation systems, pose estimation devices, and methods carried out by pose estimation systems and devices, and more specifically, to system, devices, and methods for generating a pose estimate of an object.

BACKGROUND

Robots, vehicles, and other devices and systems may use computer vision to perform various tasks. For instance, a robot may use computer vision to interact with an object in a scene, perhaps by using a mechanical arm to grasp the object. A vehicle (such as an autonomous vehicle) may use computer vision to perform an intervention of behalf of the vehicle driver, perhaps by changing a trajectory of the vehicle to avoid an object on a road identified in a scene.

However, existing systems do not provide a sufficient mechanism for performing computer vision based on images representing respectively different views of a given scene. Moreover, existing systems do not adequately account for ambiguity within a given scene.

SUMMARY

An embodiment of the present disclosure takes the form of a method carried out by a pose estimation device. The method includes obtaining an image of an object, and generating a pose estimate of the object. The pose estimate includes a respective heatmap for each of a plurality of pose components of a pose of the object, and the respective heatmap for each of the pose components includes a respective uncertainty indication of an uncertainty of the pose component at each of one or more pixels of the image.

Another embodiment takes the form of a pose estimation device that includes a processor and a non-transitory computer-readable storage medium that includes instructions. The instructions, when executed by the processor, cause the pose estimation device to obtain an image of an object, and generate a pose estimate of the object. The pose estimate includes a respective heatmap for each of a plurality of pose components of a pose of the object, and the respective heatmap for each of the pose components includes a respective uncertainty indication of an uncertainty of the pose component at each of one or more pixels of the image.

A further embodiment takes the form of a method carried out by a pose estimation device. The method includes generating one or more training images, each of the training images including a two-dimensional projection of an object model in a respective pose. The method further includes generating a respective heatmap set for each of the training images. The respective heatmap set includes a respective ground-truth uncertainty heatmap for each of a plurality of pose components of the respective pose of the object model projected onto the training image. The respective ground-truth uncertainty heatmap includes a respective uncertainty assignment of an uncertainty of the pose component at each of one or more pixels of the respective training image. The method further includes training a neural network based on the training images and the ground-truth uncertainty heatmaps in the respective heatmap sets generated for the training images, and receiving an image of an object obtained via a sensor. The method also includes generating a respective uncertainty heatmap via the neural network for each of a plurality of pose components of a pose of the object. The respective uncertainty heatmap includes a respective uncertainty indication of an uncertainty of the pose component at each of one or more pixels of the image.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 4a depicts components of a pose in an object space, according to one or more embodiments described and illustrated herein;

FIG. 6b depicts an example of a three-dimensional heatmap for an elevation pose component, according to one or more embodiments illustrated and described herein;

DETAILED DESCRIPTION

A device may estimate a pose of an object as observed via a camera or other sensor. The pose of the object may include several pose components, such as an elevation or an azimuth of an observer (such as a camera) with respect to the object.

The pose of the object as seen by one observer may differ from the pose of the object as seen by a second observer. In such instances, the device could generate multiple pose estimates—for example, by generating respective pose estimates for images of the object from different points of view. However, in many case, these different pose estimates cannot be fused to create a pose estimate that incorporates the information of all the pose estimates and that is accordingly more accurate than a pose estimate of an object observed from a single point of view.

Pose estimation systems, pose estimation devices, and methods for generating a pose estimate of an object are described herein. In some embodiments, a pose estimation device obtains an image of an object, and generates a pose estimate of the object. The pose estimate includes a respective heatmap for each of a plurality of pose components of a pose of the object, and the respective heatmap for each of the pose components includes a respective uncertainty indication of an uncertainty of the pose component at each of one or more pixels of the image. By generating pose estimates with respective uncertainty heatmaps for the pose components, the generated pose estimates can be fused with each other or with other probabilistic information. Various embodiments of pose estimation systems, pose estimation devices, and methods for generating a pose estimate of an object will now be described in detail with reference to the drawings.

Figure 1:
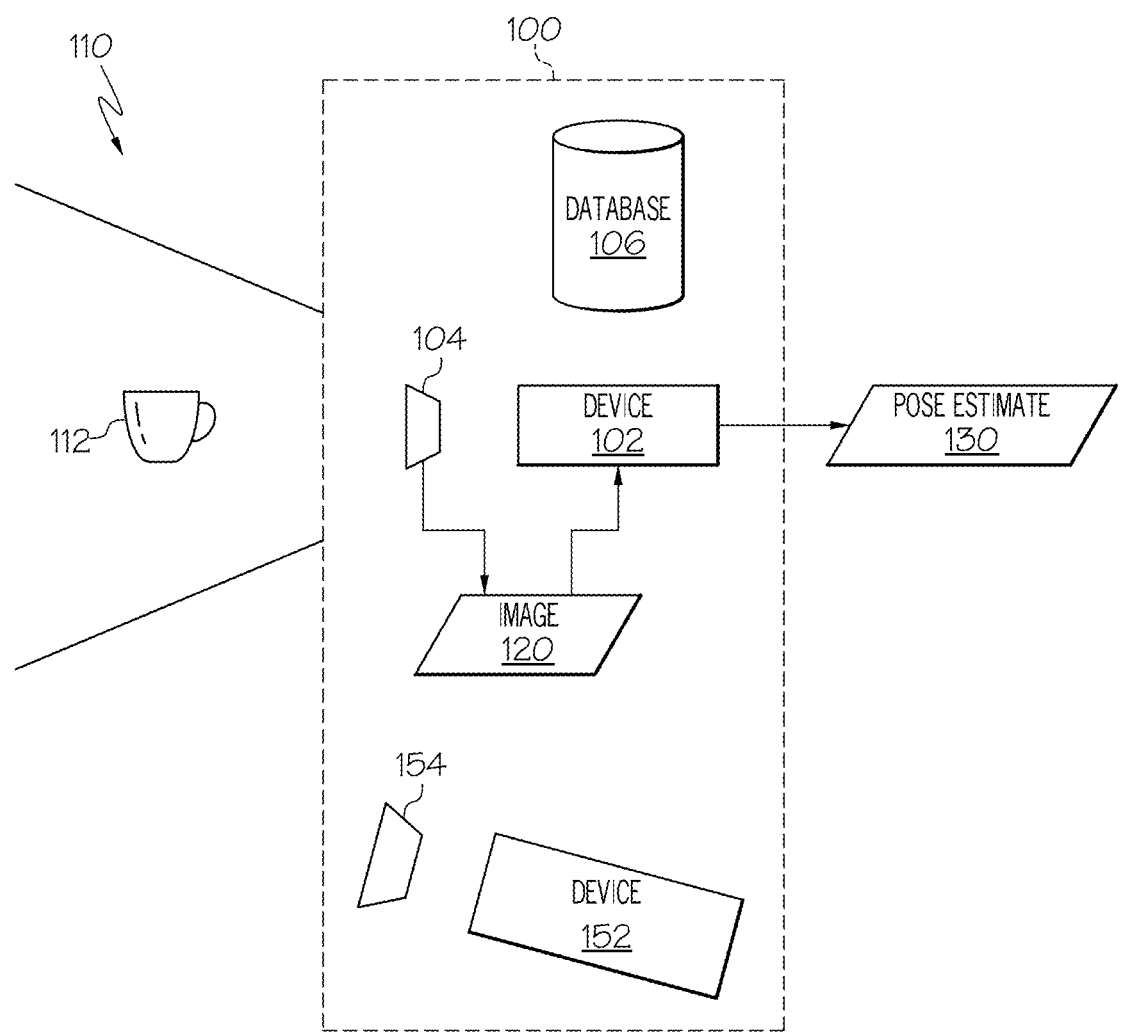
FIG. 1 depicts a pose estimation system, according to one or more embodiments illustrated and described herein.

FIG. 1 depicts a pose estimation system, according to one or more embodiments illustrated and described herein. As shown, a system 100 includes a pose estimation device in the form of device 102, a sensor 104, and a database 106. System 100 obtains an image 120 of an object 112, and generates a pose estimate 130 of a pose of object 112.

Device 102 may take the form of any device capable of carrying out the pose-estimation device functions described herein. For instance, device 102 could take the form of a robot that includes one or more robotic hands for grabbing or manipulating objects (such as object 112), one or more wheels or robotic feet for moving the robot, or a combination of these, as just some examples. As another possibility, device 102 could take the form of a vehicle, such as an autonomous vehicle, a semi-autonomous vehicle, a manually-operated vehicle (for example, in the form of an automobile, as shown in FIG. 1), or any combination of these, among other examples. As a further possibility, device 102 could take the form of a server computer, a mainframe, a virtual machine, a workstation, a terminal, or a personal computer, as examples. It should be understood that device 102 could take the form of any combination of these or other devices. In an embodiment, system 100 generates pose estimate 130 via device 102.

Sensor 104 (also referred to as an image sensor) could take the form of one or more sensors operable to obtain data representing an image of a scene, and to perform any other of the sensor functions described herein. In an embodiment, system 100 obtains image 120 via sensor 104. In some embodiments, sensor 104 may be positioned or mounted on device 102—for instance, device 102 could take the form of a robot or a vehicle, and sensor 104 could be mounted on an exterior of the robot or vehicle. In some embodiments, sensor 104 is separate from but communicatively connected to device 102—for instance, via a network.

In an embodiment, sensor 104 obtains signals (such as electromagnetic radiation) that can be used by device 102 to obtain an image of a scene from a perspective of the sensor. For example, sensor 104 could take the form of (or include) a digital camera, a radar sensor, a lidar sensor, or any combination of these or other sensors. The camera may collect light or other electromagnetic radiation and may generate an image of a scene based on the collected radiation. The radar sensor and/or the lidar sensor may send a signal (such as pulsed laser light or radio waves) and may obtain a distance measurement from the sensor to the surface of an object (such as object 112) based on a time of flight of the signal—that is, the time between when the signal is sent and when the reflected signal (reflected by the object surface) is received by the sensor.

Database 106 may store one or more three-dimensional object models (or other models) of objects such as object 112, one or more images (such as image 120) obtained via sensor 104, or other data, as examples. Database 106 could take the form of a database management system (DBMS) such as a relational or non-relational DBMS, a server computing device, a cloud computing device, or any combination of these or other databases. Additionally or alternatively, database 106 may take the form of a table, a flat file, data in a filesystem of a data storage, a heap file, a B+ tree, a hash table, a hash bucket, or any combination of these. Database 106 could take the form of a device that is separate from device 102, in which case the database may be communicatively connected to device 102—for instance, via a network. Object models, images, and other data could be obtained by device 102 from database 106 via the network. Additionally or alternatively, device 102 may include database 106, and the object models, images, or other data could be stored in a data storage of device 102.

As indicated above, in some embodiments, system 100 may include a network, which in turn could include one or more computing systems and at least one network infrastructure configured to facilitate transferring data between one or more entities communicatively connected to the network (such as device 102, sensor 104, and/or database 106). The network may include one or more wide-area networks (WANs) and/or local-area networks (LANs), which may be wired and/or wireless networks. In some examples, the network may include the Internet and/or one or more wireless cellular networks, among other possibilities. The network may operate according to one or more communication protocols such as Ethernet, Wi-Fi, internet protocol (IP), transmission control protocol (TCP), long-term evolution (LTE), and the like. Although the network is shown as a single network, it should be understood that the network may include multiple, distinct networks that are themselves communicatively linked. One or more entities of system 100 may be communicatively connected to the network via respective communication links that facilitate communication between entities communicatively connected to the network, and could take the form of one or more wired and/or wireless communication links. Any of the communication links may be a combination of hardware and/or software, perhaps operating on one or more communication-link layers such as one or more physical, network, transport, and/or application layers. The network and the communications links could take other forms as well.

System 100 may include different and/or additional components. For instance, as shown in FIG. 1, system 100 may include at least one additional device such as a device 152, at least one additional sensor such as a sensor 154, or any combination of these or other components. Though sensor 104 may at times be referenced in the singular within this disclosure, it should be understood that sensor 104 may take the form of (or include) a single sensor or multiple sensors.

Scene 110 may take the form of a physical environment as perceived at a given time by an observer, such as sensor 104 or sensor 154, and object 112 may be in scene 110. For instance, scene 110 could include surfaces such as a floor, walls, and tabletops, and object 112 in scene 110 could be positioned on one or more of these surfaces. Scene 110 could include additional objects as well.

Object 112 could take the form of any object. For instance, device 102 could take the form of a robot, and object 112 could be an object that can be grabbed, moved, or manipulated by the robot via one or more robotic arms or actuators. As another possibility, device 102 could take the form of a vehicle, and object 112 could be a traffic sign, a pedestrian, or another vehicle, as examples. In the embodiment illustrated in FIG. 1, object 112 takes the form of a beverage mug with a handle.

Image 120 may take the form of an image of scene 110 when viewed by an observer from a given point of view (such as a point of view of sensor 104 or sensor 154). In some embodiments, image 120 may take the form of a grid of pixels—for instance, a rectangular grid of pixels. In an embodiment, image 120 takes the form of a bitmap of pixels, and the respective positions of the pixels in the image are not explicitly indicated, but are instead inferred from the data structure of the bitmap itself. In some instances, the positions of respective pixels of image 120 may be identified using a Cartesian coordinate system, where the x-axis represents horizontal positions of the pixels and the y-axis represents vertical positions of the pixels (or vice versa). The origin of the coordinate system may take the form of an arbitrary position in image 120, such as a center of the image or a given corner of the image.

Image 120 could take the form of a visual image, a radar image, or a lidar image, as examples. For instance, the image could take the form of a digital representation of a photograph or a still frame of a video, and could be an uncompressed or compressed image such as a Joint Photographic Experts Group (JPEG) image, a Portable Network Graphics (PNG) image, a Tagged Image File Format (TIFF) image, or a Graphics Interchange Format (GIF) image, among other possibilities.

Pose estimate 130 may be generated by device 102 based on image 120. Additional details regarding the pose estimate are provided below.

Figure 2:
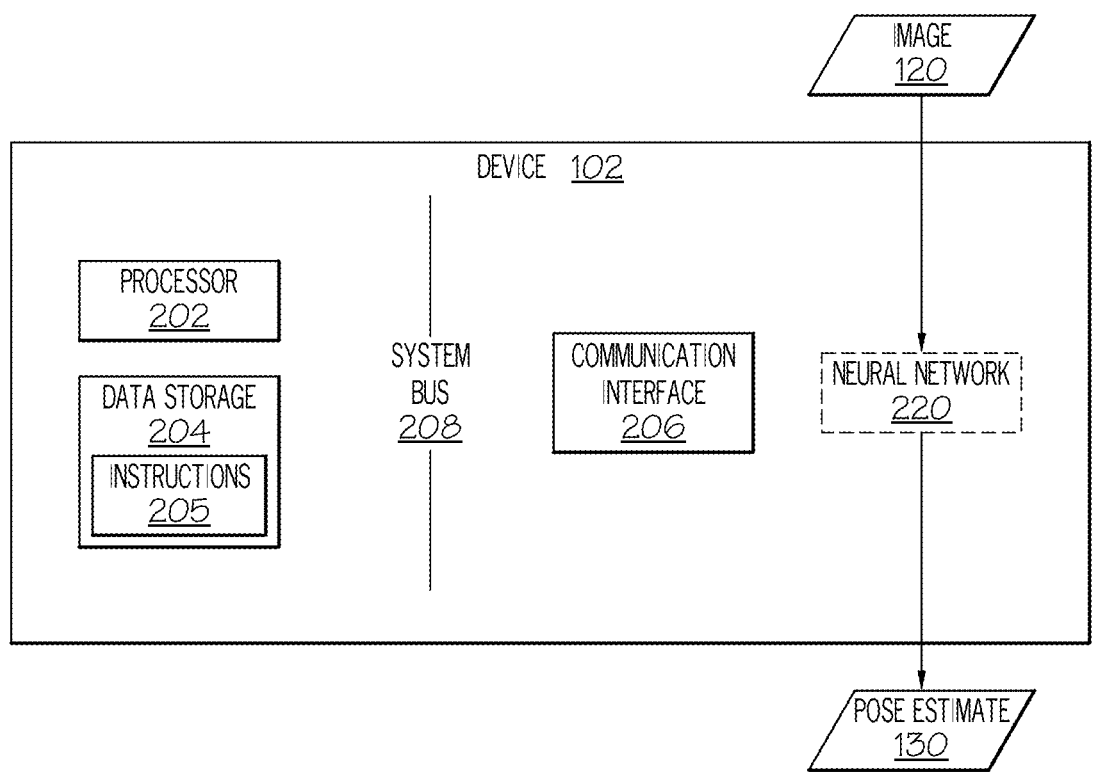
FIG. 2 depicts a pose estimation device, according to one or more embodiments illustrated and described herein.

FIG. 2 depicts a pose estimation device, according to one or more embodiments illustrated and described herein. As shown, device 102 includes a processor 202, a data storage 204, and a communication interface 206, each of which are communicatively connected via a system bus 208. Device 102 obtains image 120 and generates pose estimate 130 based on the obtained image. As shown, device 102 executes a neural network 220.

Processor 202 may take the form of one or more general-purpose processors and/or one or more special-purpose processors, and may be integrated in whole or in part with data storage 204, communication interface 206, and/or any other component of device 102, as examples. Accordingly, processor 202 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 204 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a database management system, any other non-volatile storage, or any combination of these, to name just a few examples.

Instructions 205 may be stored in data storage 204, and may include machine-language instructions executable by processor 202 to cause device 102 to perform the pose-estimation functions described herein. Additionally or alternatively, instructions 205 may include script instructions executable by a script interpreter configured to cause processor 202 and device 102 to execute the instructions specified in the script instructions. Those having skill in the art will recognize that instructions 205 may take other forms as well.

Additional data may be stored in data storage 204, such as one or more training images or object models of objects, as will be described in further detail below. The additional data could be stored as a table, a flat file, data in a filesystem of the data storage, a heap file, a B+ tree, a hash table, a hash bucket, or any combination of these, as examples.

Communication interface 206 may be any component capable of performing the communication-interface functions described herein. As such, communication interface 206 could take the form of an Ethernet, Wi-Fi, Bluetooth, and/or USB interface, among many other examples. In an embodiment, device 102 obtains image 120 via sensor 104, which could involve the device obtaining the image from sensor 104 via communication interface 206.

System bus 208 may be any component capable of performing the system-bus functions described herein. In an embodiment, system bus 208 is any component configured to transfer data between processor 202, data storage 204, communication interface 206, and/or any other component of device 102. In an embodiment, system bus 208 includes a traditional bus as is known in the art. In other embodiments, system bus 208 includes a serial RS-232 communication link, a USB communication link, and/or an Ethernet communication link, alone or in combination with a traditional computer bus, among numerous other possibilities. In some examples, system bus 208 may be formed from any medium that is capable of transmitting a signal, such as conductive wires, conductive traces, or optical waveguides, among other possibilities. Moreover, system bus 208 may be formed from a combination of mediums capable of transmitting signals. System bus 208 could take the form of (or include) a vehicle bus, such as a local interconnect network (LIN) bus, a controller area network (CAN) bus, a vehicle area network (VAN) bus, or any combination of these or mediums. Those of skill in the art will recognize that system bus 208 may take various other forms as well.

In the embodiment illustrated in FIG. 2, device 102 executes neural network 220. Instructions 205 stored in data storage 204 may include instructions executable by processor 202 for causing device 102 to execute the neural network 220. Additionally or alternatively, device 102 may include one or more hardware modules such as one or more electronic control units (ECUs), and neural network 220 may be executed by the ECU, processor 202, or a combination of these, as examples. Neural network 220 could take the form of a feedforward neural network, a convolutional neural network, a recurrent neural network, a deep neural network (such as a deep convolutional neural network), or any combination of these or other artificial neural networks. In an embodiment, device 102 generates pose estimate 130 via neural network 220—for instance, device 102 may provide image 120 to neural network 220, and neural network 220 may generate the pose estimate based on the provided image.

Figure 3A:
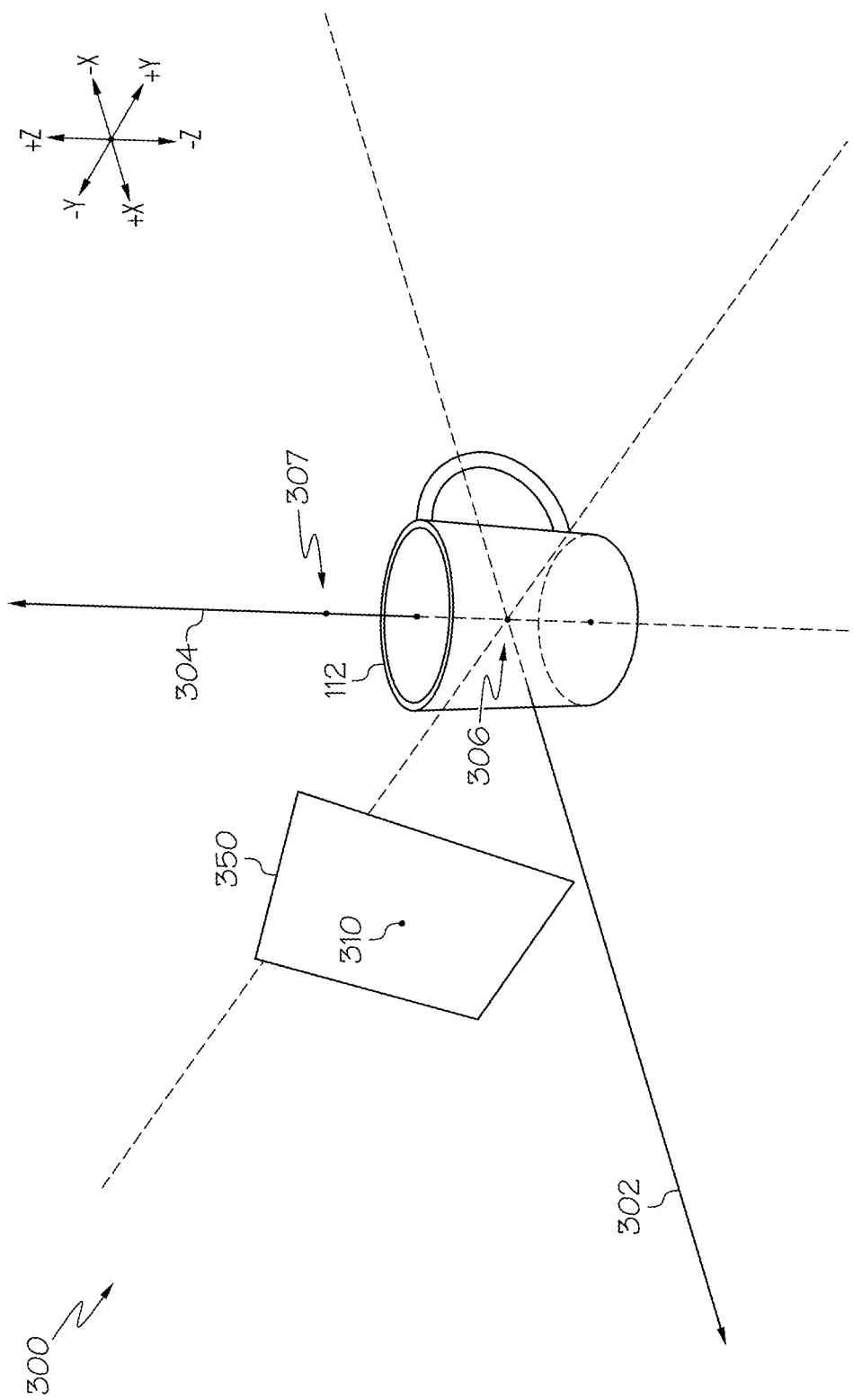
FIG. 3a depicts an object space with respect to which one or more components of a pose may be represented, according to one or more embodiments illustrated and described herein.
Figure 3B:
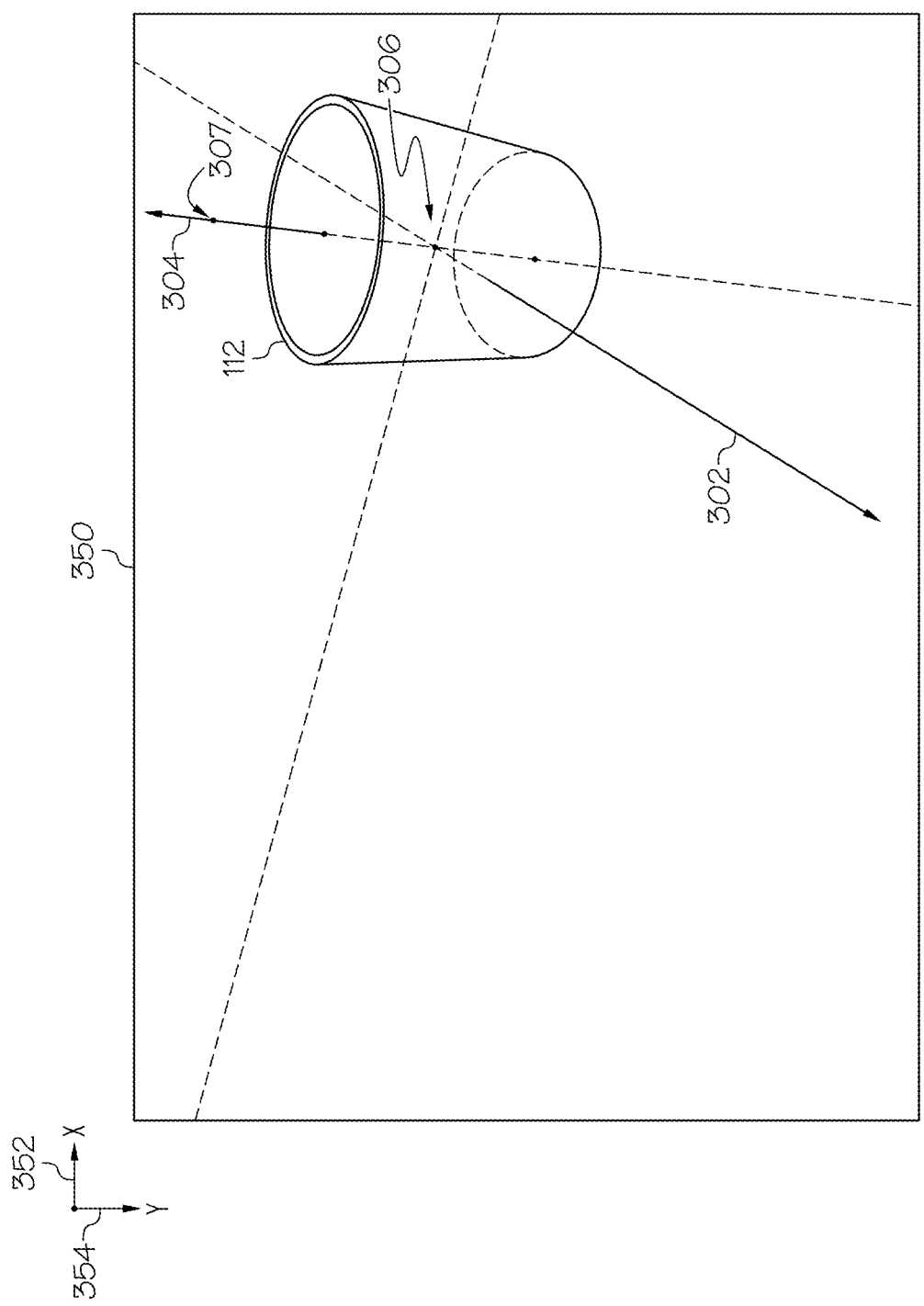
FIG. 3b depicts a camera plane with respect to which one or more components of a pose may be represented, according to one or more embodiments illustrated and described herein.

According to one or more embodiments, the respective components of a respective pose may be expressed or defined with respect to one or more spaces, such as one or more Euclidean spaces. FIGS. 3a and 3b depict example spaces with respect to which one or more components of a given pose may be represented.

Specifically, FIG. 3a depicts an object space with respect to which one or more components of a pose may be represented, according to one or more embodiments illustrated and described herein. As shown, an object space 300 takes the form of a three-dimensional Euclidean space. The object space includes an x-axis 302 and a z-axis 304 that are mutually orthogonal and intersect and at origin 306. A camera point 310 represents a position of sensor 104 in object space 300.

Also shown in FIG. 3a is object 112 in object space 300. In one or more embodiments described herein, x-axis 302 takes the form of an x-axis of object 112, and z-axis 304 takes the form of a z-axis of the object. In such embodiments, the x-axis of object space 300 may be referred to as x-axis 302 of object 112, and the z-axis of the object space may be referred to as z-axis 304 of object 112.

In an embodiment, z-axis 304 takes the form of an axis of rotational symmetry of object 112. In some instances, the axis of rotational symmetry could be an axis of the main rotationally symmetric part of the object body of object 112. For example, object 112 is shown in FIG. 3a as a mug that includes a handle and that has a generally cylindrical shape. The z-axis 304 of the mug passes through the respective centers of the circular ends of the cylinder.

In an embodiment, origin 306 takes the form of an object center of object 112, such as a centroid of the object. The centroid of the object could be, for instance, a centroid of a main rotationally symmetric part of the object's body. In such embodiments, origin 306 of object space 300 may be referred to as an object center of object 112.

A north point 307 (an object north point) in object space 300 takes the form of a point (other than origin 306) located on z-axis 304 of object 112. The reference to north point 307 as a "north" point is arbitrary, since north point 307 need not be located north relative to another point in object space 300. Additional details regarding north point 307 are provided below.

It should be noted that FIG. 3a does not identify a y-axis that is typically part of a three-dimensional Cartesian coordinate system. This is because, in the examples discussed in this detailed description, the pose components that are represented with respect to object space 300 are expressed using a spherical coordinate system, rather than a Cartesian coordinate system. However, it should be understood that pose components could be expressed using a Cartesian coordinate system without departing from the scope of this disclosure. Moreover, though an embodiment above describes x-axis 302 and z-axis 304 as respective axes of object 112, it should be understood that the axes of object 112 need not take the form of the axes of object space 300.

Also shown in FIG. 3a is a camera plane 350 which, in the illustrated embodiment, takes the form of a two-dimensional projection of the (three-dimensional) object space 300.

FIG. 3b depicts camera plane 350 with respect to which one or more pose components of a pose may be represented, according to one or more embodiments illustrated and described herein. As shown, camera plane 350 takes the form of a two-dimensional Euclidean space (i.e., a plane) onto which the (three-dimensional) object space 300 is projected (i.e., a projection plane). The camera plane includes an x-axis 352 and a y-axis 354 that are mutually orthogonal and intersect and at a given origin in the camera plane.

In an embodiment, camera plane 350 takes the form of (or includes) image 120. To illustrate, a projection plane (such as camera plane 350) is analogous to a photograph. That is, a photograph is a two-dimensional representation of a three-dimensional world. Similarly, camera plane 350 is a two-dimensional projection of the (three-dimensional) object space 300 in which object 112 of scene 110 is represented. Since image 120 may take the form of a two-dimensional image of (three-dimensional) scene 110 that includes object 112, camera plane 350 may be represented by image 120.

In an embodiment, x-axis 352 of camera plane 350 takes the form of an x-axis of image 120, and y-axis 354 of the camera plane takes the form of an x-axis of image 120. For instance, in some embodiments, camera plane 350 is congruent to image 120 and the coordinate axes of camera plane 350 overlap the coordinate axes of image 120.

Figure 4B:
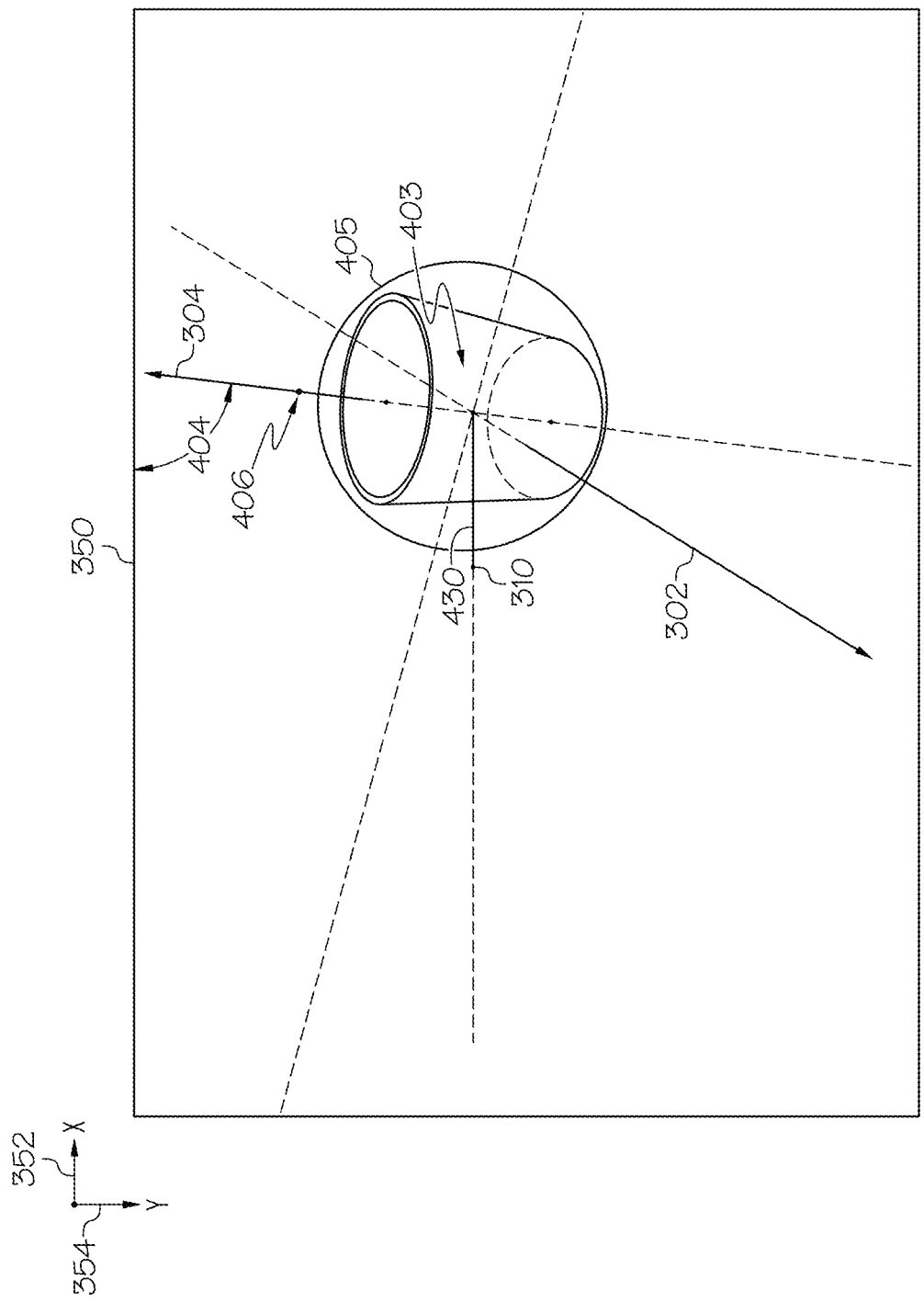
FIG. 4b depicts components of a pose in a camera plane, according to one or more embodiments described and illustrated herein.

FIGS. 4a and 4b depict pose components of a pose, according to one or more embodiments described and illustrated herein.

Specifically, FIG. 4a depicts pose components of a pose in object space 300, according to one or more embodiments described and illustrated herein. As shown, pose components of a pose may include an elevation 401 and an azimuth 402. In the illustrated embodiment, the elevation and azimuth are represented (in part) with respect to a viewing ray 430 that connects the object center (origin 306) to camera point 310.

Specifically, elevation 401 takes the form of the angle between viewing ray 430 and z-axis 304 of object 112, and azimuth 402 takes the form of the angle between viewing ray 430 and viewing ray 430. In such an embodiment, elevation 401 and azimuth 402 are represented as spherical coordinates rather than Cartesian coordinates. In such an embodiment, the azimuth coordinate of camera point 310 along viewing ray 430 may correspond to an amount of rotation around z-axis 304. For objects with rotational symmetry (such as the mug illustrated in FIG. 4a), the azimuth heatmap of pose estimate 130 (which will be discussed in further detail below) may capture the ambiguity of rotation around the z-axis—for instance, when the handle of the illustrated mug is occluded.

FIG. 4b depicts pose components of a pose in camera plane 350, according to one or more embodiments described and illustrated herein. As shown, pose components of a pose may include a keypoint 403, a north keypoint 406, an in-plane rotation 404, and an object boundary 405.

Keypoint 403 in the illustrated embodiment takes the form of the position, in camera plane 350, of the object center (origin 306) in object space 300 projected onto camera plane 350. The position may take the form of the two-dimensional coordinates of the projected object center along x-axis 352 and y-axis 354.

North keypoint 406 takes the form of the position, in camera plane 350, of north point 307 in object space 300 projected onto camera plane 350. As with the position of keypoint 403, the position of north keypoint 406 may take the form of the two-dimensional coordinates, of the projection of north point 307, along x-axis 352 and y-axis 354.

In-plane rotation 404 takes the form of (or includes) the angle, in camera plane 350, between x-axis 352 of camera plane 350 and the projection of z-axis 304 of object 112 onto camera plane 350. In some embodiments, the angle between x-axis 352 and z-axis 304 may be represented as a combination of both (i) keypoint 403 and (ii) the angle, in camera plane 350, between the respective projections of viewing ray 430 and z-axis 304 onto camera plane 350. The projection of z-axis 304 may be represented using keypoint 403 and north keypoint 406, which are projections of the object center (origin 306) and north keypoint 406 onto camera plane 350, respectively.

In some instances, a singularity condition may arise in which viewing ray 430 and z-axis 304 coincide. Accordingly, some embodiments of in-plane rotation 404 may include an additional angle such that at least one angle is well defined (i.e., such that a singularity condition will not arise for both angles simultaneously). In an embodiment, in-plane rotation 404 further includes the angle, in camera plane 350, between x-axis 352 and the projection of x-axis 302 of object 112 onto camera plane 350. In some instances—for example, if there is no ambiguity as a result of rotational symmetry of object 112 around z-axis 304—this angle may be represented as a combination of both (i) keypoint 403 and (ii) the angle, in camera plane 350, between the respective projections of viewing ray 430 and x-axis 302 onto camera plane 350.

Object boundary 405 is shown as a circle 412, in camera plane 350, that is a projection, onto the camera plane, of a sphere boundary that bounds the object 112 in object space 300. Based on object boundary 405 in combination with elevation 401, azimuth 402, and keypoint 403, device 102 can determine the length of viewing ray 430 between the object center (origin 306) and camera point 310, which represents a distance between the object center and sensor 104.

In an embodiment, the projection of z-axis 304 is determined based on a known model of object 112—for instance, based on north keypoint 406. As an example, north point 307 may be located on z-axis 304 of object 112 at a known distance from the object center (origin 306) of object 112, and the projection of z-axis 304 (or a sphere boundary of object 112, etc.) may be determined based on keypoint 403 and north keypoint 406 representing projections of the object center and the north keypoint in object space 300 onto camera plane 350, respectively. In some embodiments, device 102 obtains a three-dimensional model of object 112 from database 106, as will be explained in further detail below.

It should be understood that a pose may be represented by different and/or additional pose components. In some instances, a given pose component may be a function of one or more different pose components. For example, a pose of object 112 could be represented based at least in part on a length of viewing ray 430. The length of viewing ray 430, in turn, could be determined based on object boundary 405 and an object model of object 112.

Figure 5:
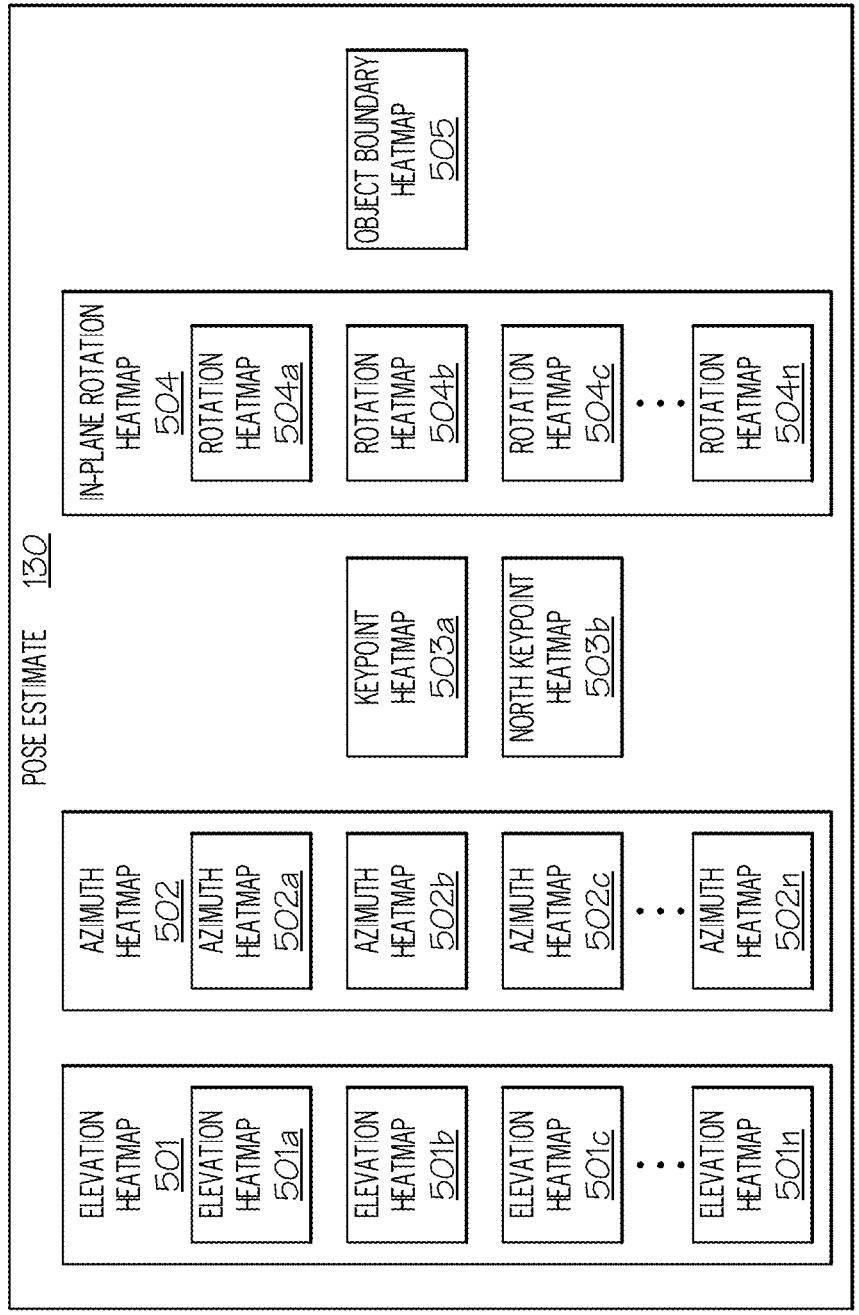
FIG. 5 depicts components of a pose estimate of a pose of an object, according to one or more embodiments illustrated and described herein.

FIG. 5 depicts components of pose estimate 130 of a pose of object 112, according to one or more embodiments illustrated and described herein. As shown in FIG. 5, pose estimate 130 includes a collection of heatmaps that includes an elevation heatmap 501, an azimuth heatmap 502, a keypoint heatmap 503a, a north keypoint heatmap 503b, an in-plane rotation heatmap 504, and an object boundary heatmap 505. It should be understood that pose estimate 130 may include different and/or additional heatmaps.

A heatmap for a given pose component includes a respective uncertainty indication for each of one or more pixels of image 120. The respective uncertainty indication for each of the one or more pixels is an uncertainty indication of an uncertainty of the pose component at the pixel. A heatmap for may include multiple uncertainty indications for a pixel of image 120. In some instances, the heatmap may not include a respective uncertainty indication for each and every pixel in the image. The respective heatmap for a given pose component may generally represent a probability distribution of the pose component (of the pose of the object in image 120).

As will be described below with reference to FIGS. 7 and 8, device 102 may generate the heatmaps of pose estimate 130 via neural network 220. The neural network in turn may generate the heatmaps based on prior trainings of the neural network. For instance, neural network 220 may include one or more network parameters, and as will be discussed below, the neural network may generate the heatmaps based on the network parameters. Device 102 may set these parameters during training of the neural network.

With reference again to FIG. 5, a given heatmap of pose estimate 130 may take the form of a grid of heatmap elements arranged into a number of rows and a number of columns. In an embodiment, image 120 takes the form of a grid of pixels arranged into a given number of rows and a given number of columns, and the heatmap elements of the heatmap are arranged into the same number of rows and the same number of columns as the image. In such an embodiment, each heatmap element corresponds to a given pixel of the image and vice versa. In another embodiment, a given heatmap of pose estimate 130 takes the form of a grid (of heatmap elements) that is scaled with respect to the grid of pixels that form the image 120. For instance, the number of rows $w_H$ and columns $h_H$ of a heatmap H could be represented as $$(w_H, h_H) = \left(\frac{w_I}{s}, \frac{h_I}{s}\right)$$

where s is a scaling factor, and $w_I$ and $h_I$ are the number of rows and columns (respectively) of an image I.

A heatmap element may include a respective uncertainty indication for the pixel corresponding to the heatmap element, in which case the uncertainty indication is an indication of an uncertainty of the pose component at the corresponding pixel. In an embodiment, the heatmap elements of a heatmap include no more than one uncertainty indication, in which case the heatmap takes the form of a two-dimensional heatmap. In another embodiment, at least one heatmap element includes multiple uncertainty indications, in which case the heatmap takes the form of a three-dimensional heatmap. As described herein, a first and second dimension of a grid of heatmap elements correspond to the columns and rows of the grid, respectively, and the third dimension corresponds to respective uncertainty indications in a respective heatmap element. For instance, the third dimension of the three-dimensional grid may correspond to a respective two-dimensional heatmap grid of heatmap elements that each include no more than one uncertainty indication. The number of two-dimensional heatmaps in the third dimension (of the three-dimensional heatmap for a given pose component) may be equal to the number of uncertainty indications for the pixel of image 120 having the most uncertainty indications (in the heatmap for the given pose component). Other examples are possible as well.

In some instances, the heatmap may not include a respective uncertainty indication for each and every heatmap element. In some embodiments, any heatmap element (in a given heatmap) having at least one uncertainty indication has the same number of uncertainty indications as every heatmap element (in the same heatmap) having at least one uncertainty indication. That is, a given heatmap element has either no uncertainty indications or has the same number of uncertainty indications as every other heatmap element (except for those heatmap elements having no uncertainty indications).

With reference again to FIG. 5, elevation heatmap 501 takes the form of a three-dimensional heatmap. The first and second dimensions of elevation heatmap 501 may correspond to the columns and rows of the grid, respectively, as discussed above. In FIG. 5, the third dimension of elevation heatmap 501 corresponds to respective two-dimensional elevation heatmaps 501a, 501b, 501c, and 501n.

Each of the two-dimensional heatmaps of elevation heatmap 501 may correspond to a respectively different elevation 401. For instance, elevation heatmap 501a may correspond to an elevation angle of zero, and elevation heatmap 501b may correspond to an elevation angle of one-quarter pi. A respective uncertainty indication in the elevation heatmap corresponding to a given elevation 401 may be an indication of an uncertainty of the elevation angle of the object 112 represented at the respective pixel (or set of pixels), assuming that the position (in camera plane 350) of the object center (origin 306) in object space 300 projected onto camera plane 350 is at keypoint 403, and/or assuming that the position (in camera plane 350) of north point 307 in object space 300 projected onto camera plane 350 is at north keypoint 406, as examples. For instance, a respective uncertainty indication in the elevation heatmap corresponding to an elevation angle of zero may be an indication that the elevation angle of object 112 represented at the respective pixel or pixels is zero if the position of the object center were at keypoint 403. FIG. 6b illustrates an example of a three-dimensional elevation heatmap.

Azimuth heatmap 502 also takes the form of a three-dimensional heatmap. In the illustrated embodiment, the third dimension of azimuth heatmap 502 corresponds to respective two-dimensional azimuth heatmaps 502a, 502b, 502c, and 502n. The two-dimensional heatmaps of azimuth heatmap 502 may each correspond to a respectively different azimuth 402, and a respective uncertainty indication in the two-dimensional azimuth heatmap corresponding to a given azimuth angle may be an indication of an uncertainty of the azimuth angle of object 112 represented at the respective pixel (or pixels), perhaps assuming for instance that the position of the center or the north point of the object is at keypoint 403 or north keypoint 406, respectively, when the object in object space 300 is projected onto camera plane 350.

Keypoint heatmap 503a and north keypoint heatmap 503b take the form of respective two-dimensional heatmaps. Similar to elevation heatmap 501 and azimuth heatmap 502, the first and second dimensions of keypoint heatmap 503a and north keypoint heatmap 503b may correspond to the columns and rows of the respective grids of the heatmaps. In an embodiment, each uncertainty indication of keypoint heatmap 503a takes the form of an indication of an uncertainty that keypoint 403 is represented at a respective pixel (or pixels)—i.e., that the object center (origin 306) is represented at the respective pixel or set of pixels. An example of keypoint heatmap 503a is described below with reference to FIG. 6a.

In-plane rotation heatmap 504 takes the form of a three-dimensional heatmap. In the illustrated embodiment, the third dimension of in-plane rotation heatmap 504 corresponds to respective two-dimensional in-plane rotation heatmaps 504a, 504b, 504c, and 504n. Each of the two-dimensional heatmaps of in-plane rotation heatmap 504 may correspond to a respectively different angle of the in-plane rotation 404 of object 112. A respective uncertainty indication in the two-dimensional in-plane rotation heatmap corresponding to a given in-plane rotation angle may be an indication of an uncertainty of the in-plane rotation angle of object 112 represented at the respective pixel, assuming for instance that the position of the center or the north point of the object is at keypoint 403 or north keypoint 406, respectively, as discussed above (among other possibilities).

Object boundary heatmap 505 takes the form of a two-dimensional heatmap. In an embodiment, each uncertainty indication of object boundary heatmap 505, which is a respective uncertainty indication of the object boundary 405 at a respective pixel (or pixels), takes the form of an indication of an uncertainty that object boundary 405 is represented at the respective pixel.

Figure 6A:
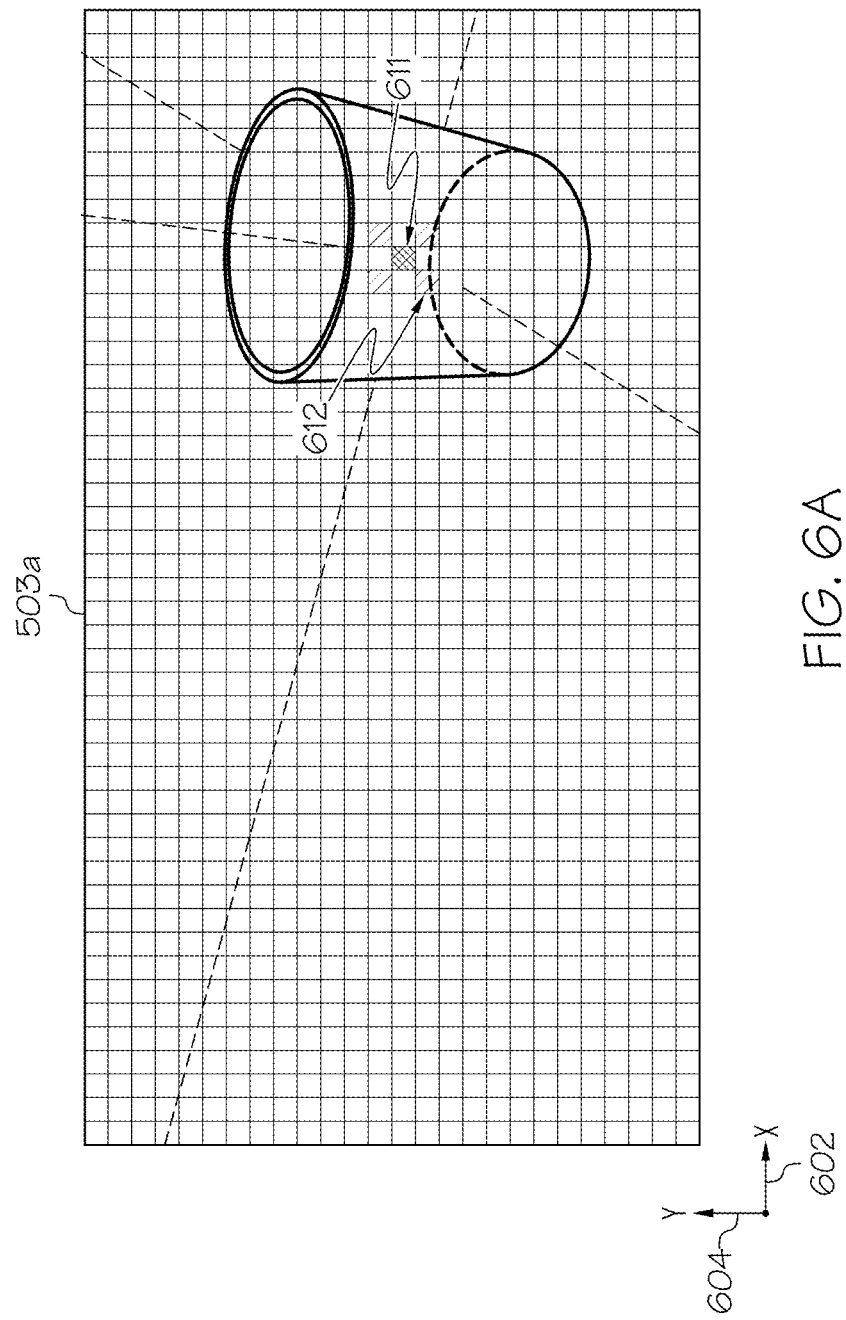
FIG. 6a depicts an example of a two-dimensional heatmap for a keypoint pose component, according to one or more embodiments illustrated and described herein.

FIG. 6a depicts an example of a heatmap for a keypoint pose component, according to one or more embodiments illustrated and described herein. In the illustrated embodiment, keypoint heatmap 503a takes the form of a grid of heatmap elements arranged into a number of columns along an x-axis 602 and a number of rows along a y-axis 604. In this embodiment, the heatmap elements of keypoint heatmap 503a are arranged into the same number of rows and the same number of columns as image 120. Accordingly, each pixel of image 120 has a corresponding heatmap element in keypoint heatmap 503a, and each heatmap element in keypoint heatmap 503a corresponds to a given pixel of image 120. However, as described previously, keypoint heatmap 503a (or any other heatmap) of pose estimate 130 may take the form of a grid (of heatmap elements) that is scaled with respect to the grid of pixels that form the image 120, among other examples.

As shown, several of the heatmap elements illustrated in FIG. 6a include hatching. In an embodiment, the heatmap elements of keypoint heatmap 503a that are shown with hatching are heatmap elements that include an uncertainty indication. That is, a heatmap element 611 and a heatmap element 612 of keypoint heatmap 503a each include a respective uncertainty indication, as do several other heatmap elements of the keypoint heatmap. The respective uncertainty indication of heatmap element 611 is an indication of an uncertainty that the object center (origin 306) of object 112 is represented at the pixel corresponding to heatmap element 611. Likewise, the respective uncertainty indication of heatmap element 612 is an indication of an uncertainty that the object center (origin 306) of object 112 is represented at the pixel corresponding to heatmap element 612. As can be seen in FIG. 6a, some heatmap elements of keypoint heatmap 503a may not include an uncertainty indication.

In the illustrated embodiment, heatmap element 612 is shown with diagonal hatching, as are a few other heatmap elements in keypoint heatmap 503a. Heatmap element 611 (and only heatmap element 611) includes crisscross hatching. In this embodiment, crisscross hatching represents a lower uncertainty indication (i.e., a higher certainty) than diagonal hatching. In other words, the uncertainty that the object center (origin 306) of object 112 is represented at the pixel corresponding to heatmap element 612 is higher than the uncertainty that the object center is represented at the pixel corresponding to heatmap element 611.

FIG. 6b depicts an example of a heatmap for an elevation pose component, according to one or more embodiments illustrated and described herein. In the illustrated embodiment, x-axis 652 and y-axis 654 of three-dimensional elevation heatmap 501 correspond to an x-axis and a y-axis of image 120, respectively. A z-axis 656 corresponds to an axis of orientation—in this example, an elevation. Each "slice" of elevation heatmap 501 on z-axis 656 corresponds to a two-dimensional heatmap representing a respective angle in the axis of orientation. For instance, as described above, elevation heatmap 501*a* may correspond to an elevation angle of zero, elevation heatmap 501*b* may correspond to an elevation angle of one-quarter pi, and so on. In this embodiment, the elevation is predicted at the same pixel location as keypoint 403.

Those of skill in the art will understand that azimuth heatmap 502 and in-plane rotation heatmap 504 may take forms similar to that of elevation heatmap 501. For instance, a z-axis of azimuth heatmap 502 may correspond to an azimuth, and a z-axis of in-plane rotation heatmap 504 may correspond to an in-plane rotation. Additionally, though the elevation in the example above is predicted at the same pixel location as keypoint 403, the elevation may be predicted at a different location, such as the same pixel location as north keypoint 406. Moreover, the azimuth and in-plane rotation of azimuth heatmap 502 and in-plane rotation heatmap 504, respectively, may be predicted at the same pixel location as keypoint 403 or north keypoint 406, or at another location. Other variations are possible as well.

In instances where object 112 is self-occluded (in the two-dimensional projection of the object onto camera plane 350), the probability distribution represented by the respective heatmap for a given pose component (or multiple pose components) may be higher than the probability distribution represented by a given heatmap for the same pose component when object 112 is not self-occluded. For instance, in FIG. 3*b*, the mug (object 112) is self-occluded because the handle in the two-dimensional projection of the mug onto camera plane 350 is hidden by the body of the mug. In this case, it may be difficult or impossible for device 102 to determine an azimuth 402 of the mug with low uncertainty, since the mug could be rotated around z-axis 304 by several radians but would still appear to be the same in image 120. In such cases, one or more uncertainty indications of azimuth heatmap 502 may be infinitely high, since it would be impossible to estimate the azimuth 402 with any amount of certainty.

Figure 7:
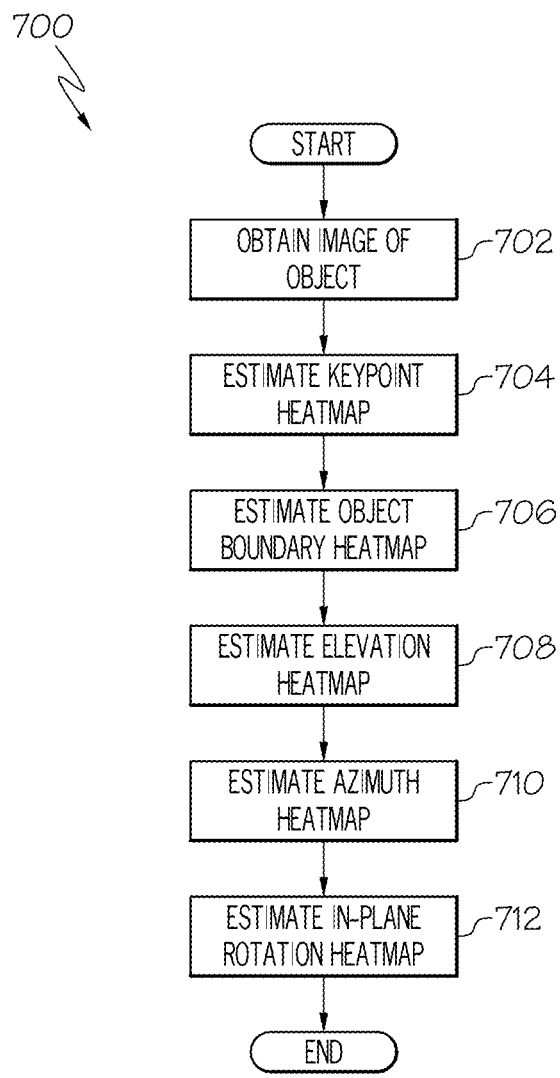
FIG. 7 depicts a flowchart of a method carried out by a pose estimation device, according to one or more embodiments illustrated and described herein.

FIG. 7 depicts a flowchart of a method 700 carried out by a pose estimation device, according to one or more embodiments illustrated and described herein. As shown, a method 700 begins at step 702 with device 102 obtaining an image 120 of object 112.

Device 102 may obtain image 120 via sensor 104, via sensor 154, or via a combination of these, as examples. As one possibility, device 102 may obtain the image as signals, and may perform signal processing and/or one or more algorithms to obtain an image from the signals using processor 202 (with could include a digital signal processor). As another possibility, device 102 may obtain an image preprocessed by a sensor or another device. In some embodiments, sensor 154 is part of device 152, and device 102 obtains image 120 via sensor 154 from device 152. As a further possibility, device 102 may obtain the image 120 from database 106, data storage 204, or another entity. Other examples are possible as well without departing from the scope of the disclosure.

In an embodiment, device 102 generates a pose estimate 130 of object 112 in image 120 obtained at step 702. The generated pose estimate includes a respective heatmap for each of a plurality of pose components of the pose of object 112. The respective heatmap for each of the pose components includes a respective uncertainty indication of an uncertainty of the pose component at each of one or more pixels. Device 102 may further estimate a pose of object 112—for instance, by estimating the respective components of the pose of object 112—and pose estimate 130 generated by device 102 may include the estimate of the pose by device 102.

In an embodiment, device 102 generates the heatmaps of pose estimate 130 via neural network 220. For instance, the device may provide the obtained image to the neural network, and may obtain a pose estimate generated by the neural network based on the obtained image provided to the neural network. In some embodiments, neural network 220 includes multiple stages, and neural network 220 generates pose estimate 130 via the stages of the neural network. In an embodiment, each of the heatmaps of pose estimate 130 are generated by neural network 220 via a respective branch of the neural network. It should be understood that neural network 220 generating a pose estimate includes device 102 generating the pose estimate via the neural network.

Neural network 220 may include one or more network parameters, and the neural network may generate the pose estimate based on the one or more of the network parameters. The network parameters could be set by device 102, for example, during a training of the neural network. An example method of training the neural network 220 is described below with reference to FIG. 8.

Steps 704 through 712 of FIG. 7 provide an example of device 102 generating a pose estimate. It should be understood, that steps 704 through 712 need not be performed in the order shown in FIG. 7, and that any one or more of steps 704 through 712 may be performed in parallel, sequentially, or a combination of these.

Specifically, at step 704, device 102 generates keypoint heatmap 503*a*, and at step 706, device 102 generates object boundary heatmap 505. These heatmaps are described above in additional detail with reference to FIG. 5. For instance, in an embodiment, generating the object boundary heatmap 505 includes estimating a sphere boundary of object 112 in object space 300, and the uncertainty indications of the object boundary heatmap are based on a two-dimensional projection of the sphere boundary onto camera plane 350. Keypoint heatmap 503*a* and object boundary heatmap 505 may be generated by device 102 via neural network 200, based on training of the neural network as described below with reference to FIG. 8.

In some embodiments, device 102 may estimate a scale of object 112, and/or estimate a distance between sensor 104 and the object center of object 112 (represented as origin 306 in object space 300), based on an object boundary 405 estimated by device 102. For example, device 102 may estimate which object model (among object models in database 106) most-closely resembles the object 112 projected onto image 120. The object model may represent an object of a given size—for instance, a mug with a radius of 2 inches and a height of 4 inches. Device 102 may compare a radius of a sphere around the object model (a sphere boundary) with a radius of object boundary 405 of object 112 as estimated by device 102. Based on this comparison, device 102 can estimate the scale (e.g., size) of object 112 and the distance to the object center (origin 306) of object 112. Accordingly, object boundary heatmap 505, which as discussed above may indicate respective uncertainties that object boundary 405 is represented at respective pixels, may be used by device 102 to determine an uncertainty of the estimated scale and/or distance. The object model could be used to generate the respective heatmaps for other pose components as well.

In some embodiments, generating the pose estimate includes estimating a sphere boundary of object 112 in object space 300. The uncertainty indications of object boundary heatmap 505 may be based on a two-dimensional projection of the sphere boundary onto camera plane 350. In one such embodiment, device 102 obtains an estimated object radius based on object boundary heatmap 505, and identifies a three-dimensional object model of object 112 from among a database of object models. Based on a comparison of the obtained estimated radius to a size of the identified object model, device 102 estimates both a scale of object 112 and a distance between the object and sensor 104. As an example, the estimated object radius could be represented as:

$$r_C = \frac{r_O \times l}{d}$$

where an obtained estimated radius $r_C$ is the sphere boundary radius in pixels (e.g., the radius in pixels of object boundary 405 in camera plane 350), a size $r_O$ of the identified object model is a sphere boundary radius in meters (in object space 300), a length l of viewing ray 430 is a focal length, and a distance d between the object and the image sensor is an object z position in the camera plane.

As further shown in FIG. 7, at step 708, device 102 generates elevation heatmap 501, and at step 710, the device generates azimuth heatmap 502. At step 712, device 102 generates in-plane rotation heatmap 504, and at step 714, device 102 generates north keypoint heatmap 503b. These heatmaps are described in additional detail with reference to FIG. 5, and like keypoint heatmap 503a and object boundary heatmap 505, may be generated by device 102 via neural network 200 based on training of the neural network (as described below with reference to FIG. 8).

In an embodiment, device 102 may fuse a second pose estimate with pose estimate 130 generated by device 102. The second pose estimate may be generated in a manner similar to pose estimate 130, and may include respective heatmaps for one or more of the same pose components as the heatmaps of pose estimate 130. Because the heatmaps of both pose estimates include uncertainty indications for respective pixels, any of the heatmaps of the pose estimates for a respective pose component can be fused to potentially provide a more accurate heatmap of uncertainty indications of uncertainties of the respective pose component. If device 102 estimated a given pose component for which the uncertainties of the pose component could not be represented in a heatmap with respect to individual pixels of image 120, then fusing the respective estimates of the given pose component may prove more difficult.

Figure 8:
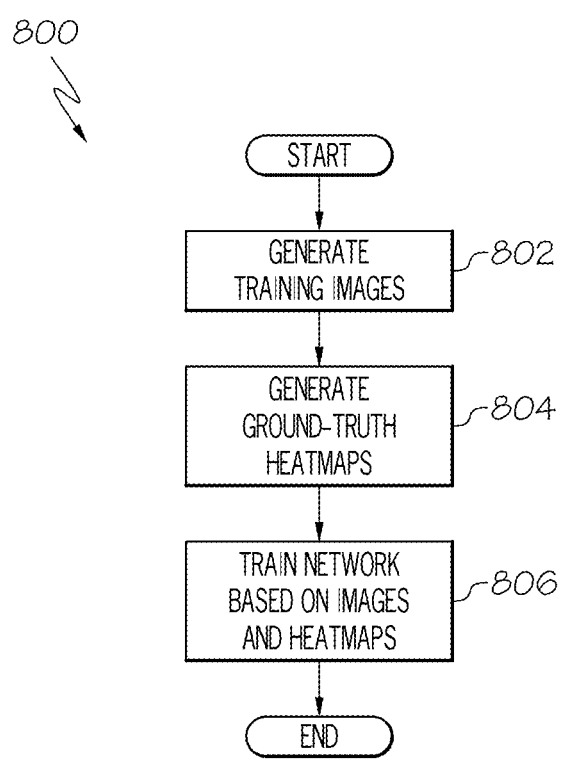
FIG. 8 depicts a flowchart of a method carried out by a pose estimation device, according to one or more embodiments illustrated and described herein.

FIG. 8 depicts a flowchart of a method 800 carried out by a pose estimation device, according to one or more embodiments illustrated and described herein. As shown, a method 800 begins at step 802 with device 102 generating a set of one or more training images. Each of the training images includes a two-dimensional projection of an object model in a respective pose.

The object model is a model of an object—for instance, a three-dimensional model of the object. The object model could take the form of a mathematical representation of one or more surfaces of the object in three dimensions. For instance, the object model could include a collection of points in a three-dimensional object space, connected by various geometric entities such as triangles, lines, or curved surfaces, among other examples. The object model could take other forms as well.

In an embodiment, generating a given training image include device 102 obtaining an object model. Device 102 may obtain the object model from database 106, data storage 204, or another entity, which may store models of one or more objects. In some instances, the object model is a model among a pre-compiled dataset used for pose estimation and pose-estimation training. The obtained model could be chosen arbitrarily or randomly by device 102, or could be specified by input received via a user interface.

Device 102 may select a training pose of the object model for the given training image. For instance, device 102 may select the respective training pose P1 of the object model of a first training image as an incrementally different pose from the respective training pose P2 of the same object model of a second training image. The incremental difference between P1 and P2 could be an incremental difference between a given pose component of the training images, such as an incremental difference between the respective azimuth components of the training images. As a further possibility, the incremental difference between training poses P1 and P2 could include incremental differences of multiple pose components. Other examples of selecting the training pose are possible as well.

In an embodiment, device 102 generates a training image that includes a two-dimensional projection of the obtained object model in the selected training pose. Device 102 may generate the training image based on one or more techniques for producing two-dimensional images from three-dimensional models. The two-dimensional projection could be a projection of the three-dimensional object model of the object onto a two-dimensional projection plane of the training image, as similarly described above with reference to FIGS. 3a and 3b.

In some embodiments, device 102 generates a training image that includes a two-dimensional projection of the obtained object model overlaid on an image of a scene. Device 102 may obtain the image of the scene from database 106, data storage 204, or another entity, which may store one or more images that are obtained via one or more sensors and that are subsequently saved to the database and/or data storage. The image may be an image of a pre-compiled dataset used for pose estimation and pose-estimation training. The obtained image could be chosen arbitrarily or randomly by device 102, or could be specified by input received via a user interface. As another possibility, device 102 may obtain the image via sensor 104, via sensor 154, or via a combination of these, as examples. Device 102 may render the projected object model at a given location in the image of the scene. The location could be, for instance, on a tabletop, a floor, the ground, or another surface, as examples, or could be another location that may not be on a surface. The training pose of the object model may be selected for consistency or coherency with the location of the projected object model in the image. Device 102 may obtain the location based on input received via a user interface, or may select the location randomly or arbitrarily, as examples.

At step 804, device 102 generates a respective heatmap set for each of the training images. The respective heatmap set includes a respective ground-truth uncertainty heatmap for each of a plurality of pose components, and respective ground-truth heatmap includes an uncertainty of the pose component at each of one or more pixels of the respective training image. As with the heatmaps described above, any one or more the respective heatmaps may include one or more heatmap elements. A respective heatmap element may include an uncertainty of the pose component at a given pixel of the respective training image, or at multiple pixels of the respective training image. For example, a respective heatmap element may include an uncertainty with respect to a group of adjacent pixels in a given training image. In an embodiment, generating the respective heatmap set for each of the training images at step 804 includes generating (for the training image) the respective ground-truth uncertainty heatmap in the heatmap set for each of the pose components.

In an embodiment, device 102 approximates the respective ground-truth uncertainty heatmaps with a local Gaussian around the selected (ground-truth) pose using finite differences on the training images generated by device 102. In one such embodiment, a training image I is a function $f(X)$ of a selected pose X under a Gaussian pixel noise with a standard deviation σ. The heatmaps generated for the training image are approximated using a first-order Taylor expansion:

$$p(X \mid I) \propto p(I \mid X) p(X)$$

$$\propto \exp\left(\frac{1}{\sigma^2} \|f(X) - I\|^2\right)$$

$$\approx \exp\left(\frac{1}{\sigma^2} \|J_0(X - X_0) + f(X_0) - I\|^2\right)$$

where $X_0$ is the selected pose, and $$J_0 = \frac{\partial f}{\partial X}\bigg|_{X=X_0}$$

(the derivate of $f$ at $X_0$. $p(X)$ is constant for a uniform prior of the selected pose X. The heatmap $p(X|I)$ is approximated as a Gaussian with mean $f(X_0)$ and the information (inverse covariance) matrix $\Sigma^{-1} = \sigma^{-1} J_0^T J_0$. Device 102 approximates a Jacobian matrix $J_0$, using finite differences, by computing pixel differences between two rendered images of the object at poses $X_0+\delta$ and $X_0-\delta$.

In an embodiment, a first training image and a second training image generated by device 102 at step 802 include respective two-dimensional projections of the same object model in a first pose and a second pose different from the first, respectively, as selected by device 102. Specifically, the selected poses of the object models of both training images are the same, except that a given pose component of the first pose is slightly different that the same pose component of the second pose. Device 102 determines a difference indication based on a determined difference between the first image and the second image using a given difference algorithm (e.g., approximating a Jacobian matrix by computing pixel differences between the first training image and the second training image).

The magnitude of the uncertainty indications of a heatmap for a given pose component is correlated to the magnitude of the inverse of the determined difference indication. A difference indication for a difference between a first pair of training images will be smaller than a difference indication for a difference between a second pair of training images, if the determined difference between the second pair of training images is larger than the determined difference between the first pair of training images. The inverse of the difference indication for the first pair of training images will be greater than the inverse of the difference indication for the second pair of training images. In such a case, the uncertainty indications of a heatmap for the given pose component generated for (either or both of) the first pair of training images may be larger than the uncertainty indications of an uncertainty map for the given pose component generated for (either or both of) the second pair of training images.

In some cases, the may be no difference between a pair of training images, even when the first pose and the second pose (of the respective training images in the above embodiment) are different. As an example, for object models (and objects) with rotational symmetry, there may be no difference between the training images, even if the respective azimuths of the objects are different. To illustrate, object 112 is shown in FIGS. 4a and 4b as a mug with rotational symmetry. In FIG. 4a, changes in azimuth (e.g., a rotation of the mug around z-axis 304) of the mug between two training images will result in at least some difference between the pair of training images, since the handle of the mug is visible and changes in azimuth will result in changes to the visible positions of the handle. On the other hand, in FIG. 4b, changes in azimuth of the mug between two training images will result in no difference between the pair of training images, even though the azimuth has changed between training images, because the handle of the mug in both training images is not visible. In such case, the determined difference will be zero, and the determined difference indictor will be zero. The inverse of the zero value of the determined difference indicator is infinity, and thus the uncertainty heatmaps for the azimuth pose component generated for the training image reflect an infinite uncertainty of the change of the azimuth.

At step 806, device 102 trains the neural network 220 based on the generated training images and the ground-truth uncertainty heatmaps in the respective heatmap sets generated for the generated training images. In an embodiment, training the neural network 220 includes device 102 generating, via the neural network, a pose estimate of the object model projected onto the training image, as described above with respect to FIG. 7. In an example, at step 702, device 102 obtains the training image (of the object model of a given object), which as discussed above, could be stored in database 106 and/or data storage 204, among numerous other possibilities. At step 704, device 102 generates a pose estimate of the object model (of the object). The device generates the respective heatmap of the pose estimate via neural network 220 for each of the plurality of pose components of the pose of the object model.

Device 102 calculates a loss between the pose estimate of the object model in the training image as generated by neural network 220, and a pose estimate comprised of the heatmap set generated for (the object model in) the training image by the device at step 804. The calculated loss may reflect a magnitude of similarity or dissimilarity between the pose estimates. In some instances, a lower calculated loss may correspond to a greater similarity between the pose estimates. For example, if device 102 calculates a first loss between a first pair of pose estimates, then a second loss calculated between a second pair of pose estimates may indicate that the first pair of pose estimates are more similar to each other than the second pair of pose estimates are to each other.

Calculating the loss between the pose estimate generated by neural network 220 and a pose estimate comprised of the heatmap set generated by device 102 at step 804 may include device 102 calculating a loss between the respective heatmaps of the pose estimates for one or more of the pose components. For instance, device 102 may calculate a loss between the azimuth heatmap of the pose estimate generated by neural network 220 and the azimuth heatmap of a pose estimate comprised of the heatmap set generated at step 804. The device could further calculate a loss between the respective elevation heatmaps of the pose estimates, or the respective heatmaps for another pose component. Similar to the calculated loss between the pose estimates, the calculated loss between the heatmaps for a respective pose component may reflect a similarity or dissimilarity between the heatmaps (e.g., a similarity or dissimilarity of the probability distributions represented by the heatmaps). For instance, a lower calculated cost between the heatmaps for a respective pose component may correspond to a greater similarity between the heatmaps (e.g., a greater similarity between the probability distributions).

It should be noted that the calculated loss does not necessarily reflect the magnitudes of the respective uncertainty indications of the pose estimates or heat maps. For instance, the calculated loss between heatmaps representing probability distributions indicating high uncertainty may nevertheless be a small calculated loss if the high-uncertainty probability distributions are similar.

Device 102 may set one or more network parameters of neural network 220 based on the calculated loss between the pose estimate generated by neural network 220 and a pose estimate comprised of the heatmap set generated by device 102 at step 804. Subsequent pose estimates generated by neural network 220 may be generated based on the network parameters set by the device. For instance, device 102 may generate, via the neural network, a pose estimate of an object model projected onto a second training image, and may calculate a loss between the generated pose estimate and a pose estimate comprised of a heatmap set generated for (the object model in) the second training image. Neural network 220 may generate the pose estimate based on the set network parameters.

In some embodiments, each of the heatmaps of pose estimate 130 are generated by neural network 220 via a respective branch of the neural network, and training the neural network 220 includes training the respective branches of the neural network. For instance, each branch may include one or more branch parameters, and any one or more of the branch parameters of a given branch may be different from the branch parameters of one or more of the other branches. In such an embodiment, setting one or more network parameters of neural network 220 based on the calculated loss between the pose estimate generated by neural network 220 and the pose estimate comprised of the heatmap set generated by device 102 at step 804 may include setting one or more branch parameters of one or more branches of neural network 220 based on the calculated loss. In some embodiments, the calculated loss includes a calculated loss between the respective heatmap for a given pose component in the pose estimate generated by neural network 220 and the respective heatmap for the same pose component in the pose estimate comprised of the heatmap set generated at step 804. In such an embodiment, setting the network parameters may include setting the branch parameters of the branch that generated the heatmap.

It should now be understood that one or more embodiments described herein are directed to pose estimation systems, pose estimation devices, and methods for generating a pose estimate of an object. In some embodiments, a pose estimation device obtains an image of an object, and generates a pose estimate of the object. The pose estimate includes a respective heatmap for each of a plurality of pose components of a pose of the object, and the respective heatmap for each of the pose components includes a respective uncertainty indication of an uncertainty of the pose component at each of one or more pixels of the image.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method carried out by a pose estimation device, the method comprising:
    obtaining an image of an object via an image sensor;
    generating a pose estimate of the object by estimating a sphere boundary of the object in a three-dimensional object space comprising a three-dimensional representation of the object, the pose estimate comprising a respective heatmap for each of a plurality of pose components of a pose of the object, the plurality of pose components comprising an elevation of the object, an azimuth of the object, an object center of the object, an object north point of the object, an in-plane rotation of the object, and an object boundary of the object, and the respective heatmap for each of the pose components comprising a respective uncertainty indication of an uncertainty of the pose component at each of one or more pixels of the image, wherein the uncertainty indications of the respective object boundary heatmap are based on a two-dimensional projection of the sphere boundary onto a two-dimensional camera plane comprising a two-dimensional projection of the three-dimensional object space onto the camera plane;
    obtaining an estimated object radius based on the object boundary heatmap;
    identifying a three-dimensional object model of the object from among a database of the object models; and
    based on a comparison of the obtained estimated radius to a size of the identified object model, estimating both a scale of the object and a distance between the object and the image sensor; wherein:
    the object space comprises a three-dimensional representation of the object;
    an origin of the object space corresponds to the object center of the object; and
    a position of a camera point in the object space corresponds to a position of the image sensor in the scene.

2. The method of claim 1, wherein:
    a respective elevation heatmap of the elevation of the object comprises a respective three-dimensional heatmap,
    a respective azimuth heatmap of the azimuth of the object comprises a respective three-dimensional heatmap,
    a respective keypoint heatmap of the object center of the object comprises a respective two-dimensional heatmap, a respective north keypoint heatmap of the object north point of the object comprises a respective two-dimensional heatmap, a respective in-plane rotation heatmap of the in-plane rotation of the object comprises a respective three-dimensional heatmap, and a respective object boundary heatmap of the object boundary of the object comprises a respective two-dimensional heatmap.

3. The method of claim 2, wherein:

a first dimension and a second dimension of the heatmaps of the pose correspond to a first axis and a second axis of the image, respectively, a third dimension of the elevation heatmap corresponds to an elevation angle of the object, a third dimension of the azimuth heatmap corresponds to an azimuth angle of the object, and a third dimension of the in-plane rotation heatmap corresponds to an in-plane rotation angle of the object.

4. The method of claim 3, wherein the respective heatmap for each of the pose components comprises a respective grid of heatmap components that is scaled along the first dimension and the second dimension with respect to a grid of pixels that form the image.

5. A pose estimation device comprising a processor and a non-transitory computer-readable storage medium having instructions that, when executed by the processor, cause the pose estimation device to:

obtain an image of an object via an image sensor;

generate a pose estimate of the object by estimating a sphere boundary of the object in a three-dimensional object space comprising a three-dimensional representation of the object, the pose estimate comprising a respective heatmap for each of a plurality of pose components of a pose of the object, the plurality of pose components comprising an elevation of the object, an azimuth of the object, an object center of the object, an object north point of the object, an in-plane rotation of the object, and an object boundary of the object, and the respective heatmap for each of the pose components comprising a respective uncertainty indication of an uncertainty of the pose component at each of one or more pixels of the image, wherein the uncertainty indications of the respective object boundary heatmap are based on a two-dimensional projection of the sphere boundary onto a two-dimensional camera plane comprising a two-dimensional projection of the three-dimensional object space onto the camera plane;

obtain an estimated object radius based on the object boundary heatmap;

identify a three-dimensional object model of the object from among a database of the object models; and based on a comparison of the obtained estimated radius to a size of the identified object model, estimate both a scale of the object and a distance between the object and the image sensor; wherein:

the object space comprises a three-dimensional representation of the object;

an origin of the object space corresponds to the object center of the object; and a position of a camera point in the object space corresponds to a position of the image sensor in the scene.

6. The pose estimation device of claim 5, wherein:

a respective elevation heatmap of the elevation of the object comprises a respective three-dimensional heatmap, a respective azimuth heatmap of the azimuth of the object comprises a respective three-dimensional heatmap, a respective keypoint heatmap of the object center of the object comprises a respective two-dimensional heatmap, a respective north keypoint heatmap of the object north point of the object comprises a respective two-dimensional heatmap, a respective in-plane rotation heatmap of the in-plane rotation of the object comprises a respective three-dimensional heatmap, and a respective object boundary heatmap of the object boundary of the object comprises a respective two-dimensional heatmap.

7. The pose estimation device of claim 6, wherein:

a first dimension and a second dimension of the heatmaps of the pose correspond to a first axis and a second axis of the image, respectively, a third dimension of the elevation heatmap corresponds to an elevation angle of the object, a third dimension of the azimuth heatmap corresponds to an azimuth angle of the object, and a third dimension of the in-plane rotation heatmap corresponds to an in-plane rotation angle of the object.

8. The pose estimation device of claim 7, wherein the respective heatmap for each of the pose components comprises a respective grid of heatmap components that is scaled along the first dimension and the second dimension with respect to a grid of pixels that form the image.

9. A method carried out by a pose estimation device, the method comprising:

generating one or more training images, each comprising a two-dimensional projection of an object model in a respective pose;

generating a respective heatmap set for each of the training images, the respective heatmap set comprising a respective ground-truth uncertainty heatmap for each of a plurality of pose components of the respective pose of the object model projected onto the training image, the plurality of pose components comprising an elevation of the object, an azimuth of the object, an object center of the object, an object north point of the object, an in-plane rotation of the object, and an object boundary of the object, the respective ground-truth uncertainty heatmap comprising a respective uncertainty assignment of an uncertainty of the pose component at each of one or more pixels of the respective training image;

training a neural network based on the training images and the ground-truth uncertainty heatmaps in the respective heatmap sets generated for the training images;

receiving an image of an object obtained via an image sensor; and generating a pose estimate of the object by estimating a sphere boundary of the object in a three-dimensional object space comprising a three-dimensional representation of the object, the pose estimate comprising a respective uncertainty heatmap via the neural network for each of a plurality of pose components of a pose of the object, the respective uncertainty heatmap comprising a respective uncertainty indication of an uncertainty of the pose component at each of one or more pixels of the image, wherein the uncertainty indications of the object boundary heatmap are based on a two-dimensional projection of the sphere boundary onto a two-dimensional camera plane comprising a two-dimensional projection of the three-dimensional object space on the camera plane;
obtaining an estimated object radius based on the object boundary heatmap;
identifying a three-dimensional object model of the object from among a database of object models; and
based on a comparison of the obtained estimated radius to a size of the identified object model, estimating both a scale of the object and a distance between the object and the image sensor; wherein:
the object space comprises a three-dimensional representation of the object;
an origin of the object space corresponds to the object center of the object; and
a position of a camera point in the object space corresponds to a position of the image sensor in the scene.

10. The method of claim 9, wherein:
a respective elevation heatmap of the elevation of the object comprises a respective three-dimensional heatmap,
a respective azimuth heatmap of the azimuth of the object comprises a respective three-dimensional heatmap,
a respective keypoint heatmap of the object center of the object comprises a respective two-dimensional heatmap,
a respective north keypoint heatmap of the object north point of the object comprises a respective two-dimensional heatmap,
a respective in-plane rotation heatmap of the in-plane rotation of the object comprises a respective three-dimensional heatmap, and
a respective object boundary heatmap of the object boundary of the object comprises a respective two-dimensional heatmap.

11. The method of claim 10, wherein:
a first dimension and a second dimension of the heatmaps of the generated pose estimate correspond to a first axis and a second axis of the image, respectively,
a third dimension of the elevation heatmap corresponds to an elevation angle of the object,
a third dimension of the azimuth heatmap corresponds to an azimuth angle of the object, and
a third dimension of the in-plane rotation heatmap corresponds to an in-plane rotation angle of the object.

* * * * *